No. 669,579. Patented Mar. 12, 1901.
F. GRÉGOIRE.
RIDING PLOW.
(Application filed Aug. 9, 1900.)

(No Model.) 5 Sheets—Sheet 1.

Witnesses:
John F. Deufferwel
J. Ed. Page

Félix Grégoire, Inventor
By Marion & Marion
Attorneys

No. 669,579. Patented Mar. 12, 1901.
F. GRÉGOIRE.
RIDING PLOW.
(Application filed Aug. 9, 1900.)
(No Model.) 5 Sheets—Sheet 3.

Witnesses: Félix Grégoire, Inventor
By Marion & Marion
Attorneys

No. 669,579. Patented Mar. 12, 1901.
F. GRÉGOIRE.
RIDING PLOW.
(Application filed Aug. 9, 1900.)
(No Model.) 5 Sheets—Sheet 5.

Witnesses: Félix Grégoire Inventor
By Marion & Marion
Attorneys

THE NORRIS PETERS CO., PHOTO-LITHO., WASHINGTON, D. C.

UNITED STATES PATENT OFFICE.

FÉLIX GRÉGOIRE, OF ST. JEAN BAPTISTE, CANADA.

RIDING-PLOW.

SPECIFICATION forming part of Letters Patent No. 669,579, dated March 12, 1901.

Application filed August 9, 1900. Serial No. 26,357. (No model.)

*To all whom it may concern:*

Be it known that I, FÉLIX GRÉGOIRE, a subject of Her Majesty the Queen of Great Britain, residing at St. Jean Baptiste, county of Provencher, Province of Manitoba, Canada, have invented certain new and useful Improvements in Riding-Plows; and I do hereby declare that the following is a full, clear, and exact description of the invention, such as will enable others skilled in the art to which it appertains to make and use the same.

This invention relates to riding-plows; and the objects in view are to provide a plow with means by which two furrows can be made at the same time, with means by which the depth of the furrow can be regulated by adjusting the plowshare, with means to vary the line of draft on the frame of the structure, and with means for laterally and vertically adjusting the wheel on the furrow side of the implement.

Further objects and advantages of the invention will appear in the course of the subjoined description; and the novelty in the combination of devices and in the construction and arrangement of parts will be hereinafter fully described and claimed.

Figure 1:
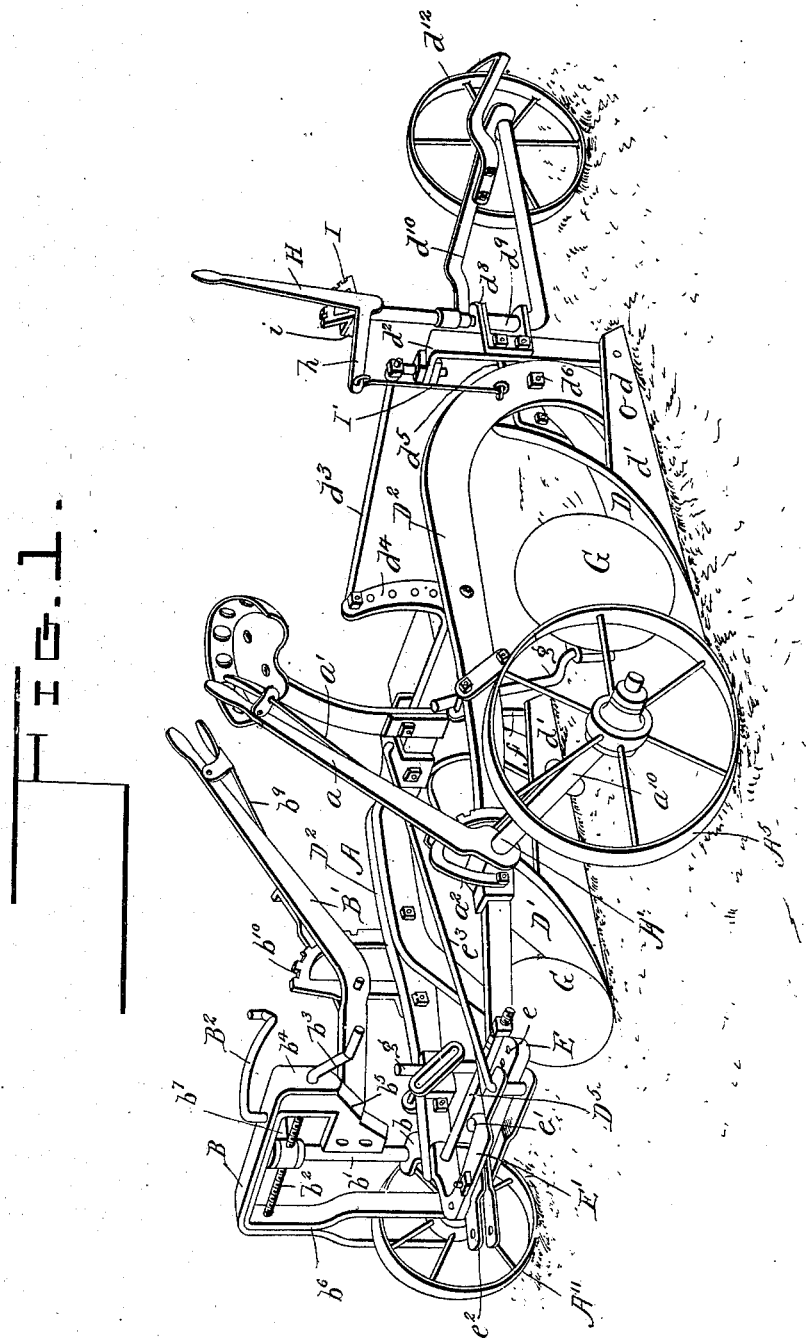
Figure 2:
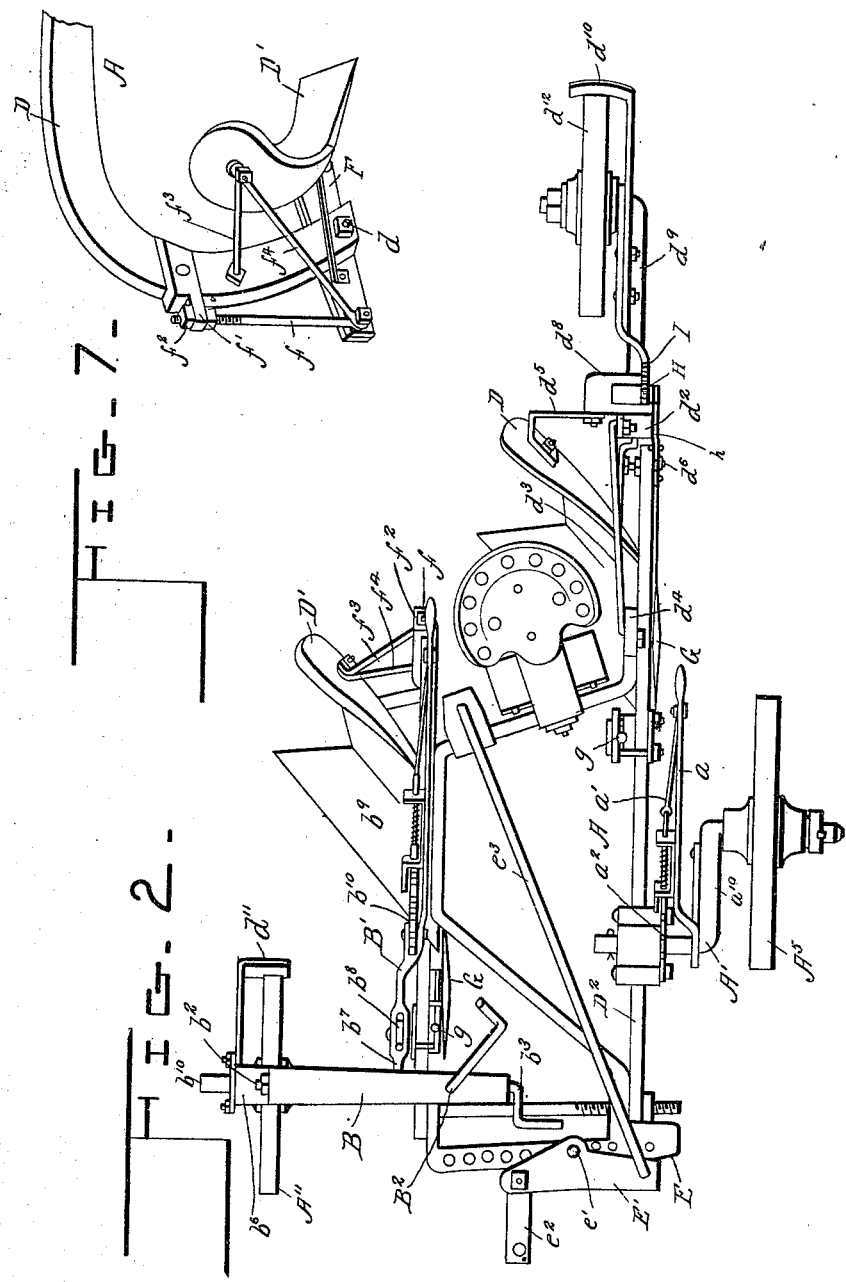
Figure 3:
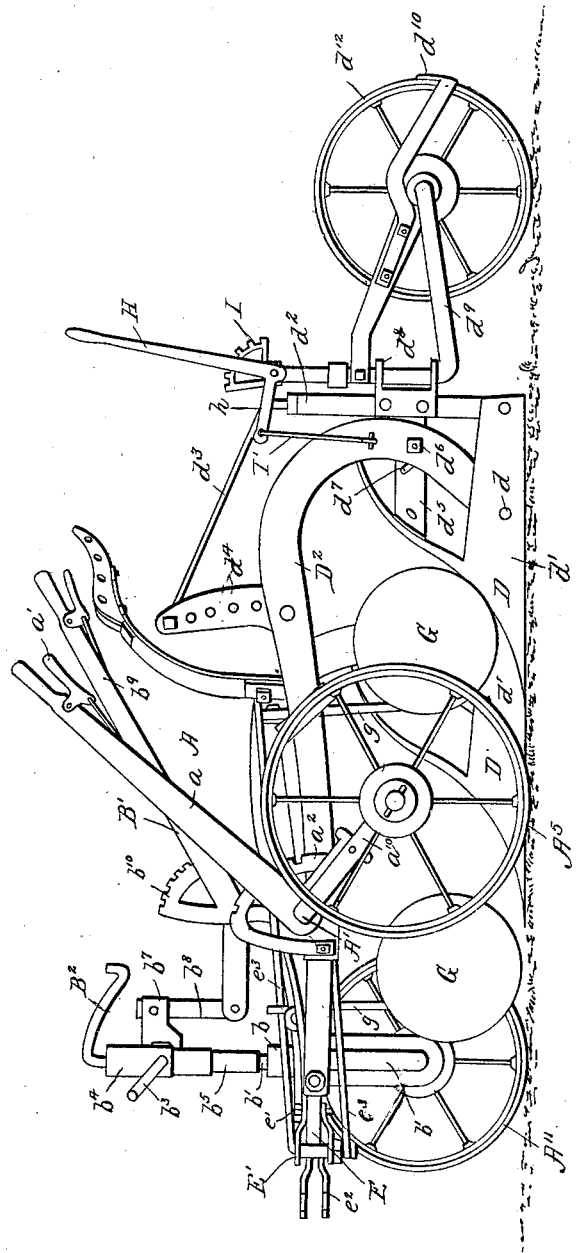
Figure 4:
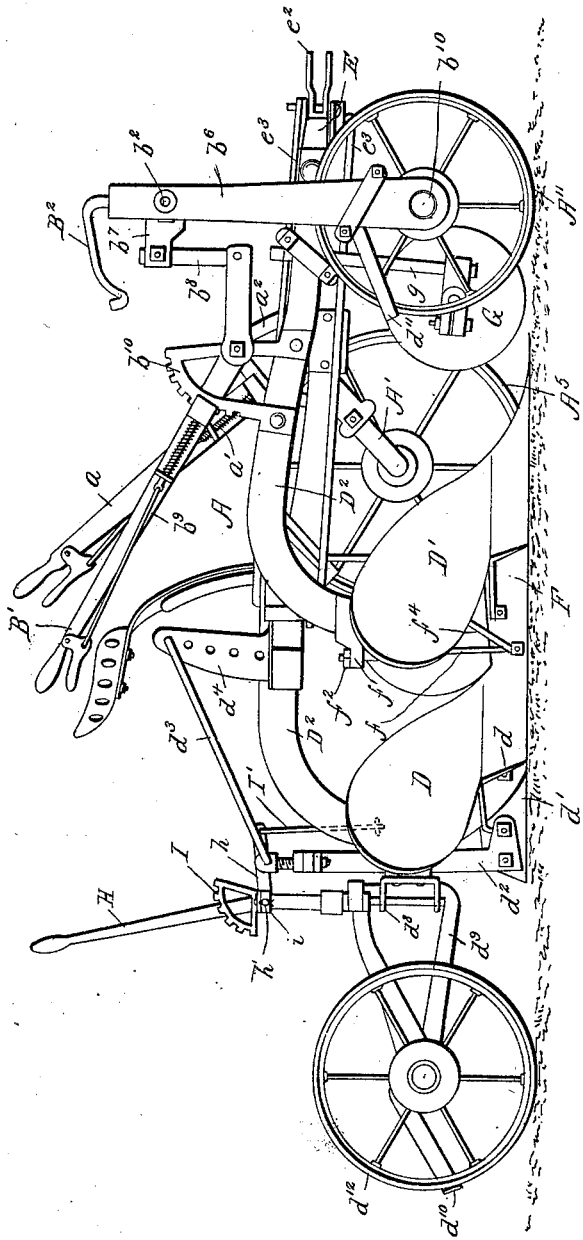
Figure 5:
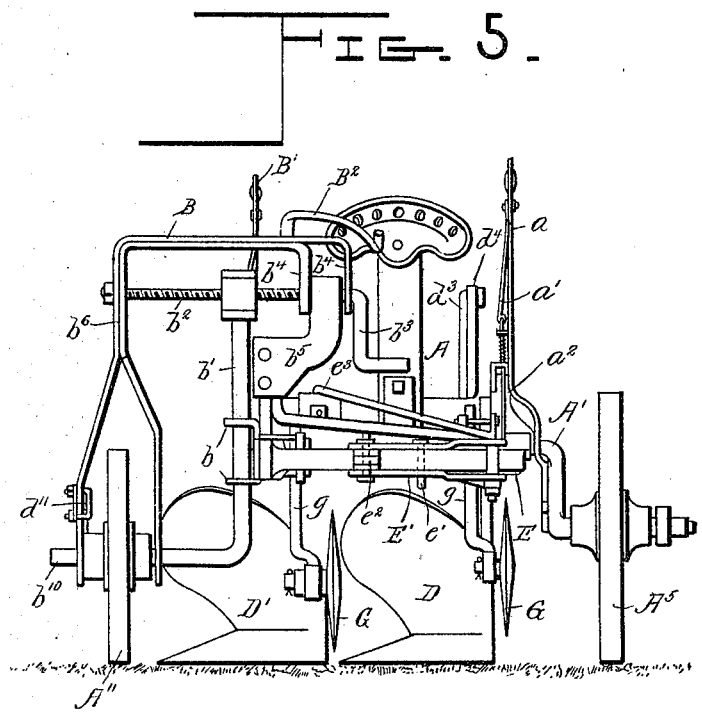
Figure 6:
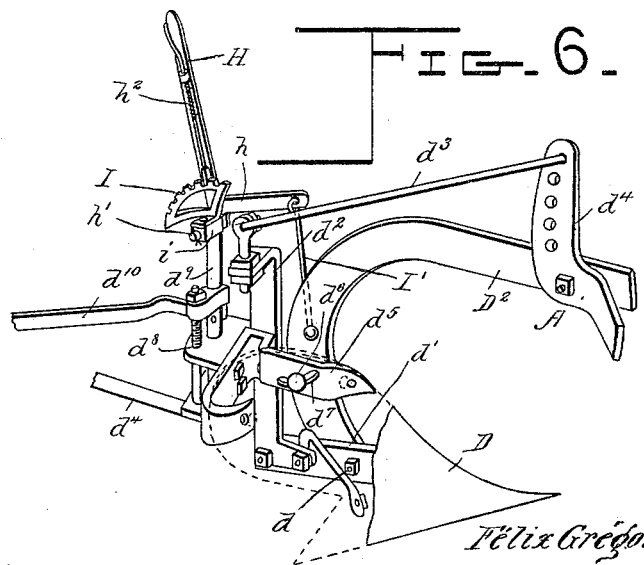

Referring to the drawings, in which similar letters of reference indicate similar parts, Figure 1 is a view in perspective of a gang-plow constructed in accordance with this invention. Fig. 2 is a top or plan view thereof. Fig. 3 is a side view thereof. Fig. 4 is a side view showing the reverse side from Fig. 3. Fig. 5 is a front view. Fig. 6 is a view in perspective of a detail. Fig. 7 is a similar view.

In the drawings, A represents the frame of a gang-plow constructed in accordance with this invention, which comprises suitable metal bars secured together and braced to give the strength necessary for the intended purpose. In one side of the forward portion of the frame is journaled the axle A', which is bent into the form of a crank-arm $a^{10}$, upon the lower end of which one wheel $A^5$ is mounted. A lever-bar $a$ is fixed to the axle A', by adjusting which the axle may be rotated, and the wheel may thus be raised off the ground. A suitable spring-latch $a'$ is connected with the lever-bar $a$ and is adapted to engage the segmental rack $a^2$ for holding the lever-bar and the wheel in their adjusted positions. Upon the forward portion of the frame, opposite the axle A', are fixed the lugs $b$, in which is revolubly and slidably mounted the spindle $b'$. The upper end of the spindle $b'$ is provided with a threaded perforation extending transversely therethrough, in which perforation is threaded the horizontal adjusting-rod $b^2$, having a suitable crank-handle $b^3$ at one end. The adjusting-rod $b^2$ is journaled in suitable bearings formed in the bracket B, in one arm $b^4$ of which bracket is rotatably supported the plate $b^5$, to which a pole or tongue is adapted to be fastened. The other arm $b^6$ of the bracket B extends downwardly and is connected with a cranked axle $b^{10}$ on the lower end of the spindle $b'$, said axle forming the support for the wheel $A^{11}$ of the machine, as best shown in Fig. 5. From the rear side of the spindle $b'$ projects a horizontally-extending lug $b^7$, the same being loosely sleeved on the spindle. In the outer end of this lug is pivoted the link $b^8$, to the lower end of which link is pivoted the end of the lever B', whereby the bracket B and the mechanism connected therewith can be raised and lowered when desired. A suitable spring-latch $b^9$ is connected with the lever B' and is adapted to engage the segmental rack $b^{10}$ for retaining the bracket B in its adjusted position, said rack $b^{10}$ being secured to the main frame of the plow.

A suitable handle $B^2$ is connected with the bracket B for turning the same in any desired position.

To a pivotal rod $D^5$ on the front end of the frame A are pivotally secured the front ends of the beams $D^2$, which carry the two plows D and D', each plow being attached to one beam by a pivot-pin $d$, passing through the landside $d'$ and the lower end of the beam.

The rear end of the landside $d'$ of the plow D is secured to an upright $d^2$, (see Figs. 6 and 7,) the upper end of which is connected by means of a rod $d^3$ to a lug $d^4$, fixed upon the plow-beam. The lug $d^4$ is provided with a number of perforations, in any one of which the rod $d^3$ may be secured, so as to retain the plowshare in its adjusted position. Upon the inner side of the bar $d^2$ is secured a metal strap $d^5$, to which the upper end of the moldboard is secured. One portion of the strap $d^5$ presses against the plow-beam and is secured thereto by means of a headed pin $d^6$, passing through the curved slot $d^7$, whereby the plowshare is firmly but pivotally secured to the plow-frame, as best shown in Fig. 6. To the rear of the bar $d^2$ is secured the lugs $d^8$, in which is journaled the wheel-hanger $d^9$, which affords a bearing for the rear wheel $d^{12}$, which trails in rear of the plow D. Connected to the rod $d^9$ in any suitable manner is a scraper $d^{10}$, which is adapted to bear upon and remove the soil from the wheel. A similar scraper $d^{11}$ is also arranged over the front wheel, as best shown in Fig. 2. I have also devised means by which the plow-beam $D^2$ and the plow attached thereto may be raised or lowered with ease and convenience at any desired time, either when the machine is in operation or when it is at rest. As one embodiment of means by which such adjustment of the beam and the plow may be attained I have provided a hand-lever H, the latter having an angular arm $h$. An upstanding bracket, bar, or other support $i$ is secured firmly to the vertical pintle which connects the trailing-wheel hanger $d^9$ to the plow, or said bracket may be fastened to one of the lugs $d^8$, in which said wheel-hanger is journaled. This upstanding bracket or arm carries or is formed with a notched segment I, on which segment the adjusting-lever H is fulcrumed, as at $h'$. This adjusting-lever is provided with a spring-latch $h^2$, arranged to engage with either of the notches of the segment for the purpose of locking the lever and the plow-beam, to which said lever is connected, in their adjusted positions. The angular arm $h$ of this adjusting-lever is connected by the link I' to the plow-beam at any suitable point, said link having one end thereof connected loosely with said beam to permit the lever H and the segment to shift their positions with relation to the beam, according to the changing positions of the trailing wheel to the line of draft of the plow. It will be understood that the lever may be moved in a downward direction for the purpose of elevating the plow and beam, after which the latch may engage with the segment to hold the lever in its depressed position and the plow in its raised position, but a reverse adjustment of the lever lowers the plow, as may be desired. This adjustment of the plow by the lever H is independent of any angular adjustment of the plow with relation to the line of draft.

The front beam E of the main frame A is provided with a number of perforations $e$, in any one of which the pin $e'$ of the draft-plate E' may be inserted, so as to provide for the adjustment of said draft-plate in a horizontal direction and transversely across the front part of the improved riding-plow. To one end of the plate E' is pivoted the clevis $e^2$, and to the other end of said draft-plate is connected a tie-rod $e^3$, which leads to the rear portion f the frame, as best shown in Fig. 2.

The plow D' is secured to the bar F, which is pivoted to the lower end of one plow-beam $D^2$ and extends in both directions beyond the same. To the rear end of the bar F is pivoted the vertical rod $f$, the upper end of which passes through the lug $f'$, to which it is adjustably secured by means of the nuts $f^2$, threaded thereon on each side of said lug, as clearly shown in Fig. 7. Suitable brace-rods $f^3$ $f^4$ connect the moldboard of the plow to the arm and bar F.

It will be seen that the means for connecting the plows D and D' to the frame provides for an adjustment of the plows in a manner to vary the inclination of the toe of the plow, so as to form a furrow of any desired depth. At a suitable point on each frame-arm is adjustably fixed a rod $g$, upon the lower end of which is loosely mounted a rotary colter G, which is constructed, preferably, in the form of a circular disk having a cutting edge.

As is common with plows of this character the plow upsets soil in such a manner that the top slice of ground is turned to the bottom of the deepest furrow, while the bottom slice of the next furrow is thrown over the same.

I desire to call attention to the fact that the furrow-wheel $A^{11}$ is capable of three several adjustments with the cranked spindle $b'$ and the shiftable frame or bracket B. The furrow-wheel is mounted loosely on the axle formed by the crank-arm $b^{10}$ and the spindle, so that said wheel may slip freely along the axle, and at the same time it is capable of moving with the axle when the spindle $b'$ is turned on its vertical axis as well as when said spindle is adjusted vertically by the manipulation of the hand-lever B'. The adjustment of the furrow-wheel $A^{11}$ in the horizontal plane and along the cranked axle of the vertical spindle is effected by giving a shifting movement to the frame or bracket B by the rotation of the threaded rod $b^2$ under the operation of the crank $b^3$, said threaded rod $b^2$ being mounted loosely in the bracket or frame B and also having a threaded engagement with the head or enlargement at the upper extremity of the vertical spindle $b'$. The vertical adjustment of the furrow-wheel is obtained by like adjustment of the spindle $b'$, which is slidably fitted in the bearings or lugs $b$ on the furrow side of the frame, said spindle being mounted to move freely in a vertical direction in the lugs and to also turn freely on the axis in said lugs. By depressing the lever B' the link $b^8$ and the lug $b^7$ are raised so as to lift the spindle, thereby lifting the furrow-wheel. The position of the furrow-wheel relative to the line of draft may be easily changed by manipulating the handle $B^2$, which is attached to the frame or bracket B, said frame or bracket being connected by the threaded rod $b^2$ with the vertical spindle $b'$ and having a branched depending end $b^6$ arranged to straddle the furrow-wheel and to engage loosely with the axle $b^{10}$ at the opposite side of said furrow-wheel. The frame and the attached parts turn with the spindle $b'$ when the handles $B^2$ are shifted and the described means provided for the convenient adjustment of the furrow-wheel in a horizontal plane, so as to maintain said furrow-wheel in a position parallel with or at an angle to the line of draft.

By reference to Fig. 7 of the drawings it will be noted that the plow-point $D'$ is supported by the bar F, which has pivotal connection with one beam $D^2$, the adjustment of said bar F and the plow-point thereon being effected by the threaded rods $f$ and the nuts $f^2$. The braces $f^3 f^4$ sustain the moldboard in proper relation to the adjustable plow-point $D'$. On the other hand, the plow D has its point carried by a bar $d'$, which is adjusted by a vertical bar $d^2$ and the link $d^3$, which is shiftably engaged with the upstanding arm $d^4$; but the moldboard of this plow D is carried or supported by a bar $d^5$, which is fast with the vertical bar $d^2$ and has a pin-and-slot connection with the beam $D^2$ to said plow D. This bar $d^5$ is fashioned and arranged to engage firmly at a number of points with the rear side of the moldboard that cooperates with the point of the plow D, and thus the moldboard and the point of the plow D are movable and adjustable in unison, so as to change the angle of the plow and regulate the depth of the furrow.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. A gang-plow, comprising a frame, a plurality of plowshares adjustably pivoted thereto; a wheeled spindle journaled in said frame; a threaded rod passing transversely through said spindle, a frame supported by said threaded rod, and means for adjusting the frame, substantially as described.

2. In a gang-plow, the combination with a frame, and a vertical spindle having a crank-axle, of a furrow-wheel shiftably and revolubly fitted on the crank-axle, and means substantially as described whereby the furrow-wheel may be shifted at will on the axle and without stopping the machine.

3. In a gang-plow, the combination with a frame, and a vertical spindle having a crank-axle, of a furrow-wheel shiftably and revolubly fitted on the crank-axle, a shiftable bracket embracing the furrow-wheel, and means for adjusting said bracket in a horizontal plane, substantially as described.

4. In a gang-plow, the combination with a frame, and a vertical spindle having a crank-axle, of a furrow-wheel shiftably and revolubly fitted on the crank-axle, a bracket loosely fitted to the crank-axle and in operative relation to the furrow-wheel, means for shifting the bracket and furrow-wheel on the crank-axle, and means for turning the spindle on its vertical axis and changing the angle of the furrow-wheel to the line of draft.

5. In a riding-plow, the combination with a plow-beam, of a bar pivoted thereto and carrying a plow-point, a vertical bar attached to the pivoted bar, a moldboard, and a supporting-bar attached to the moldboard and the vertical bar and shiftably connected to the plow-beam, substantially as described.

6. In a riding-plow, the combination with a plow-beam, of a pivoted bar carrying a plow-point, a vertical bar attached to the pivoted bar, an upstanding arm on the plow-beam, and a link between the vertical bar and said upstanding arm, said link being adjustable to vary the position of the pivoted bar and the plow-point thereon, substantially as described.

7. In a riding-plow, the combination with a plow-beam, of a pivoted bar, a plow-point and moldboard, a vertical rod connected with said pivoted bar, and an adjustable connection between said vertical rod and said plow-beam, substantially as described.

8. In a riding-plow, the combination with a frame, of a vertical cranked spindle, a furrow-wheel shiftable on said spindle, means for adjusting the spindle and furrow-wheel in a vertical plane, means for shifting the furrow-wheel at will on the cranked spindle, and means for turning the spindle on its vertical axis, each of said adjustments being effected without stopping the machine, substantially as described.

9. In a riding-plow, the combination with a frame, of a vertical cranked spindle mounted slidably on the frame and carrying a furrow-wheel, a bracket in operative relation to the furrow-wheel and fitted shiftably on the crank of the spindle, means for turning the bracket in a horizontal plane, means for adjusting the bracket in a vertical plane, and means for shifting the bracket and furrow-wheel on the spindle independently of the vertical adjustment, substantially as described.

10. In a riding-plow, the combination with a frame, of a vertical spindle mounted loosely thereon, a furrow-wheel carried by the spindle, a shiftable bracket having means for turning the spindle on a vertical axis and shifting the relation of the furrow-wheel to the line of draft, means for adjusting the bracket and the spindle vertically, and a threaded rod for shifting the bracket and the furrow-wheel on an axle of said spindle, substantially as described.

11. In a riding-plow, the combination with a frame, of a cranked spindle, a furrow-wheel loose thereon, a frame or bracket loosely fitted on the axle of said spindle and embracing said furrow-wheel, and a threaded rod mounted in the frame or bracket and engaging with said spindle, substantially as described.

12. In a riding-plow, the combination with a frame, of a cranked spindle mounted on said frame to turn on a vertical axis, a furrow-wheel, a bracket straddling the furrow-wheel and connected with said spindle, and a handle attached to the bracket for turning the latter, substantially as described.

In witness whereof I have hereunto set my hand in the presence of two witnesses.

FÉLIX GRÉGOIRE.

Witnesses:
 E. J. PARENT,
 IHLEGE BONSHONNOIS.